H. F. BEERS & H. C. BUMPUS.
ANTIDRIP DEVICE FOR FIRE HOSE.
APPLICATION FILED SEPT. 27, 1909.
956,562.
Patented May 3, 1910.
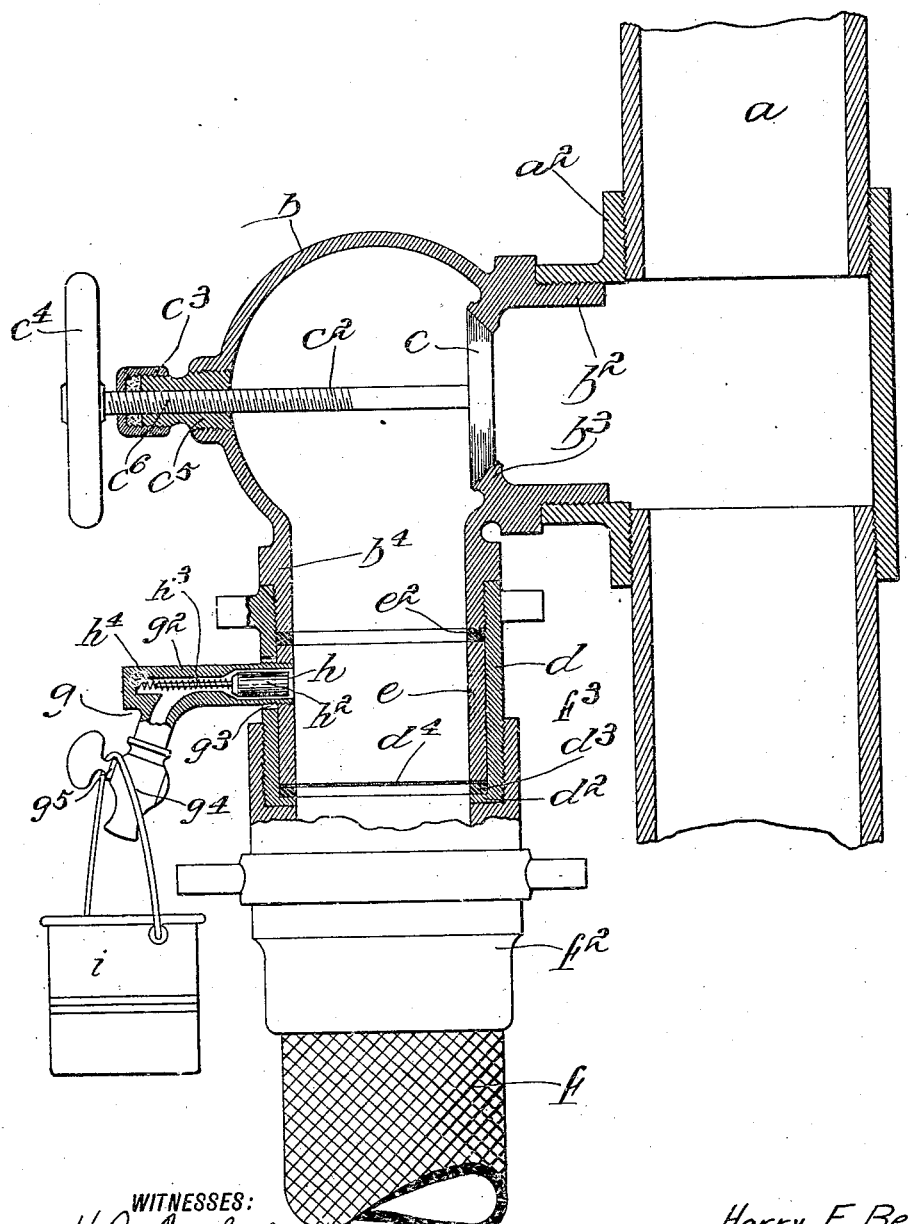

UNITED STATES PATENT OFFICE.

HARRY F. BEERS AND HERMON C. BUMPUS, OF NEW YORK, N. Y.

ANTIDRIP DEVICE FOR FIRE-HOSE.

956,562.   Specification of Letters Patent.   Patented May 3, 1910.

Application filed September 27, 1909. Serial No. 519,661.

*To all whom it may concern:*

Be it known that we, HARRY F. BEERS and HERMON C. BUMPUS, citizens of the United States, and residing at New York, in the county of New York and State of New York, have invented certain new and useful Improvements in Antidrip Devices for Fire-Hose, of which the following is a specification, such as will enable those skilled in the art to which it appertains to make and use the same.

This invention relates to fire hose which are used in connection with the standpipes of tall buildings and which are usually kept in a coiled position adjacent to said pipes and are coupled thereto to be ready for use in case of an emergency, the couplings by means of which the hose are connected with the standpipes being provided with a valve which may be opened immediately for use when desired; and the object of this invention is to provide means to prevent leakage through said valve, or through said coupling entering said hose.

It is a well known fact that in the case of large buildings where flexible fire hose are connected with standpipes and kept in position for use, coiled or otherwise, there is a constant leakage through the coupling into the hose when the latter is not in use, and this leakage quickly destroys the hose and the object of this invention is to prevent such leakage from entering the hose; and with this and other objects in view the invention consists in the construction, combination and arrangement of parts hereinafter described and claimed.

The invention is fully disclosed in the following specification of which the accompanying drawing forms a part, said drawing showing in section a part of an ordinary standpipe, and a hose coupled in connection therewith, the coupling being shown in section and showing also our improvement.

In the drawing forming part of this specification we have shown at $a$ an ordinary standpipe provided with a coupling member $a^2$ with which is connected a hose coupling $b$ of the usual form. The hose coupling $b$ is provided with a neck portion $b^2$ which is screwed onto the coupling $a^2$ and in the inner end of said neck portion is an annular valve seat $b^3$ forming an opening in communication with the pipe $a$ and normally closed by a valve $c$ having a stem $c^2$ which passes out through a stuffing box construction $c^3$ and is provided with a hand wheel or handle $c^4$. The stuffing box construction $c^3$ is provided with a central plug member $c^5$ which is screwed into the coupling $b$ and the valve stem $c^2$ where it passes through said plug member is screw threaded as shown at $c^6$ and the plug member $c^5$ is correspondingly threaded and by turning the valve stem $c^2$ in one direction the valve $c$ will be opened and by turning said stem in the opposite direction the valve will be closed. This part of the construction is the same as that heretofore employed and forms no part in our invention. The coupling $b$ is also provided with a depending tubular neck member $b^4$ and in the practice of our invention we provide a supplemental coupling $d$ which is screwed onto the neck member $b^4$ and provided at its lower end with an inwardly directed flange $d^2$ on which is placed a packing gasket $d^3$ on which is placed a destructible diaphragm $d^4$ preferably composed of tinfoil, leadfoil, or any other suitable material which will retain the drip or leakage through or around the valve $c$ but which will be destroyed by the rush of water from the pipe $a$ when said valve is opened.

Placed on the diaphragm $d^4$, within the coupling $d$ is a sleeve $e$ on which is placed a packing gasket $e^2$ and when the parts above described are connected as shown in the drawing, the gasket $d^3$, the diaphragm $d^4$, the sleeve $e$ and the gasket $e^2$ will be firmly held in place, the lower end of the neck $b^4$ of the coupling $b$ pressing on the gasket $e^2$. We have also shown at $f$ a part of an ordinary fire hose to which is secured an ordinary hose coupling $f^2$ which, in practice, is screwed onto the coupling member $d$ as shown at $f^3$.

In the use of devices of this class there is usually more or less of a leakage around the valve $c$ and this leakage passes into the hose $f$ and results in the destruction thereof, but with our improvement this leakage will be caught in the sleeve $e$ and cannot enter the hose. In order that this leakage may not in time fill the coupling $b$ and through pressure communicating thereto around the valve $c$ burst the diaphragm $d^4$, we provide the sleeve $e$ with a discharge device $g$ comprising, in the form of construction shown a tubular member $g^2$ which is passed through the coupling $d$, as shown at $g^3$ and screwed into the sleeve $e$ and said part $g^2$ is provided with a downwardly directed spigot $g^4$ having a valve $g^5$. The inner end of the part $g^2$ of the drain device is provided with a valve chamber $h$ in which is placed a plunger valve $h^2$ which is of less dimension than the chamber $h$ and around which water from the sleeve $e$ is free to flow under normal conditions and the valve $h^2$ is provided with a stem $h^3$ on which is placed a spring $h^4$ which operates to hold the valve $h^2$ normally in the position shown, but if at any time the valve $c$ be opened the rush of water into the coupling $b$ will force the valve $h^2$ to its seat and close the drain device $g$ and also burst the diaphragm $g^4$ and this water will also flow free into the hose $f$.

In the foregoing description it will be seen that our invention does not in any way interfere with the operation of the standpipe $a$, the coupling $b$ or the hose $f$ connected therewith while at the same time it prevents leakage entering said hose. The diaphragm $d^4$ may be made of any desired material and it may be made so as to be destroyed, or so that it will be ruptured with any predetermined amount of pressure thereon, and in practice the valve $g^5$ of the drain device $g$ is preferably left open at all times and if desired a bucket or other receptacle $i$ may be suspended therefrom as shown in the drawing and this bucket or other receptacle may be emptied whenever desired or the valve $g^5$ may be normally closed and may be opened at intervals to discharge the drip or leakage in the sleeve $e$, or in the bottom of the coupling.

Having fully described our invention what we claim as new, and desire to secure by Letters Patent is:—

1. The combination with a standpipe of a hose coupling having a downwardly directed member with which the hose is adapted to be connected, said downwardly directed member being provided with a destructible diaphragm and at one side thereof with a drain device.

2. The herein described means for connecting a hose with a standpipe comprising a coupling provided with a valve and a member with which the hose is adapted to be connected, said member being provided with a destructible diaphragm.

3. The herein described means for connecting a hose with a standpipe comprising a coupling provided with a valve and a member with which the hose is adapted to be connected, said member being provided with a destructible diaphragm and at one side thereof with a drain device which is normally open and adapted to be closed by pressure in the coupling.

4. The combination with a standpipe of a hose coupling provided with a valve and a projecting member with which a hose is adapted to be connected, said member being provided with a destructible diaphragm.

In testimony that we claim the foregoing as our invention we have signed our names in presence of the subscribing witnesses this twenty-second day of September 1909.

HARRY F. BEERS.
HERMON C. BUMPUS.

Witnesses:
EDGAR CADMUS,
JOHN M. MASTERTON, Jr.